United States Patent [19]
Anderson

[11] Patent Number: 5,331,267
[45] Date of Patent: Jul. 19, 1994

[54] METHOD FOR DETERMINING MOTOR SPEED OF AN INDUCTION MOTOR FOR A HOIST

[75] Inventor: Kevin J. Anderson, West Allis, Wis.

[73] Assignee: Harnischfeger Corporation, Brookfield, Wis.

[21] Appl. No.: 16,699

[22] Filed: Feb. 11, 1993

[51] Int. Cl.$^5$ .................................... H02P 5/00
[52] U.S. Cl. ...................... 318/799; 318/812
[58] Field of Search .............. 318/432, 799-812, 318/779, 257, 268; 388/800, 802, 809-815; 187/100, 101, 111, 115, 116, 118, 119; 212/146, 217, 159; 254/267, 268, 290, 296, 362; 242/75.5, 75.51; 324/161, 177

[56] References Cited

U.S. PATENT DOCUMENTS

| | | | |
|---|---|---|---|
| 3,775,579 | 11/1973 | Stone et al. | 318/742 |
| 3,845,366 | 10/1974 | Metzler et al. | 318/99 |
| 4,001,666 | 1/1977 | Grenfell | 318/731 |
| 4,166,238 | 8/1979 | Binner | 319/67 |
| 4,207,508 | 6/1980 | Habishon | 318/800 X |
| 4,519,479 | 5/1985 | Tanahashi | 187/105 |
| 4,520,906 | 6/1985 | Watanabe | 187/115 |
| 4,600,872 | 7/1986 | Shepard, Jr. | 318/658 |
| 4,965,847 | 10/1990 | Jurkowski | 388/814 |
| 5,077,508 | 12/1991 | Wycoff | 318/436 |
| 5,127,533 | 7/1992 | Virkkunen | 212/146 |

*Primary Examiner*—Jonathan Wysocki
*Attorney, Agent, or Firm*—Jansson & Shupe, Ltd.

[57] ABSTRACT

In a drive using an AC induction motor for moving a load in hoisting and lowering directions, a method for determining motor speed includes, in any order, the steps of selecting first and second voltage signals representing a maximum speed to be attained by the motor at rated output torque in the hoisting and lowering directions, respectively, and selecting a bias voltage. One of the voltage signals is combined with the bias voltage to obtain a feedback signal representing motor speed and the feedback signal is compared with a speed command signal to obtain a deviation signal representing the difference between actual and commanded motor speed. The drive is disabled if the difference is "out of" a predetermined range.

14 Claims, 5 Drawing Sheets

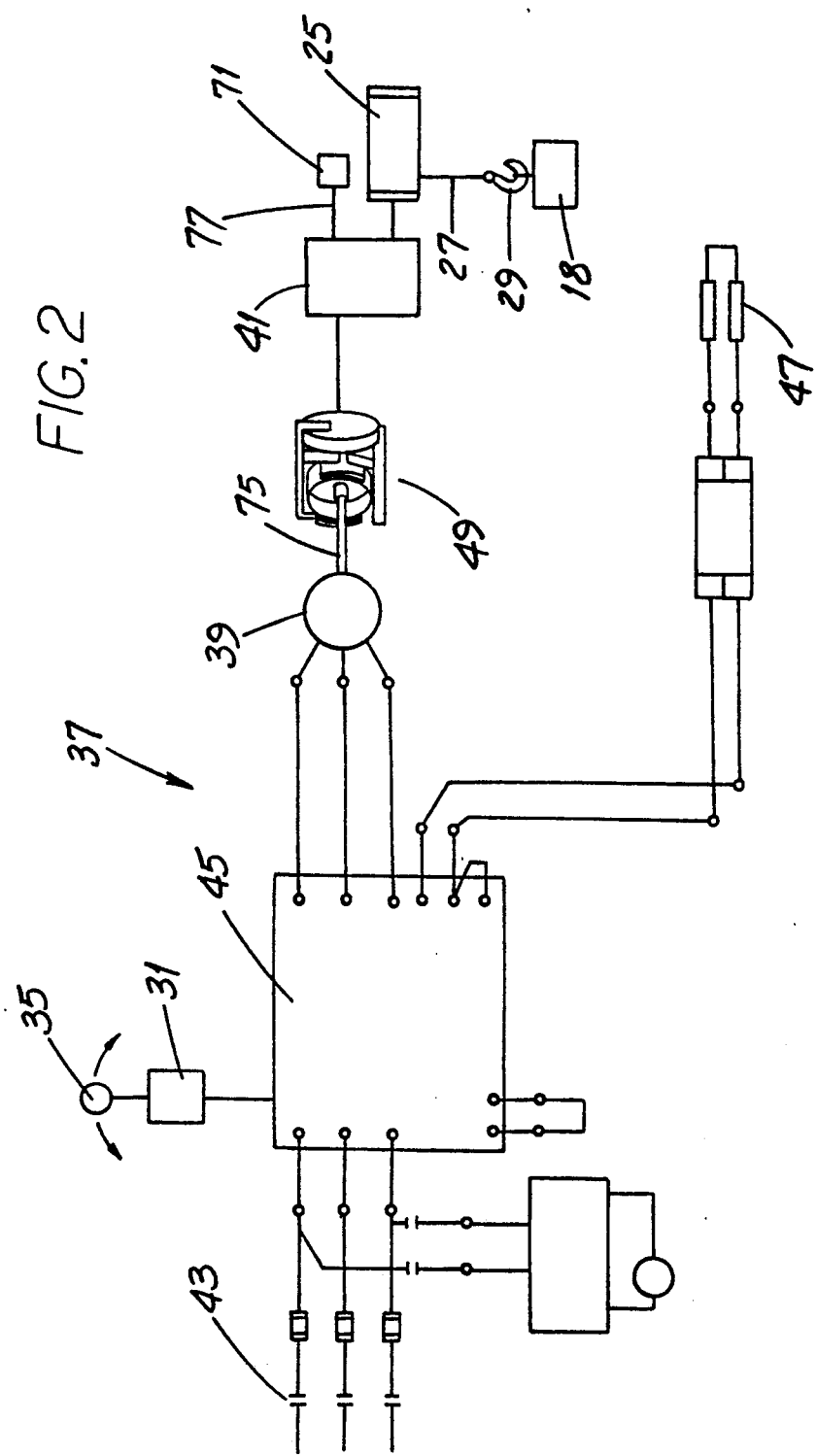

METHOD FOR DETERMINING MOTOR SPEED OF AN INDUCTION MOTOR FOR A HOIST

FIELD OF THE INVENTION

This invention relates to drive systems and, more particularly, to electrical motor drive systems.

BACKGROUND OF THE INVENTION

Electrical drive systems using electric motors to power the end-use function are in wide use for propulsion, machine drives, conveyor lines, chemical processing, material handling applications and the like. A very small sampling of exemplary drive systems appears in U.S. Pat. Nos. 3,845,366 (Metzler et al.) and 4,166,238 (Binner).

Certain types of material handling machines incorporate electric motor drive systems for moving the machine from location to location, for moving a machine "substructure" on the machine itself and for moving loads of the type the machine is designed to handle. An example of such a material handling machine is an overhead travelling crane (OTC) used in factories, steel handling bays and the like for lifting and placing loads. Such a crane traverses along a pair of elevated main rails which are parallel and spaced apart, usually by several yards. A pair of crane bridge girders extends between the rails and there are driven wheels mounted at either end of the girders for supporting the crane atop the rails. And the girders themselves have rails on them.

A substructure called a "trolley" is mounted on the girder rails and traverses the width of the bridge under motive power. A load hoist is mounted on the trolley and includes a powered hoist/lower "rope drum" or drums about which steel cable is spirally wrapped. The cable is connected to a load-lifting hook, sling, bucket, magnet or the like. With the foregoing arrangement, the operator (who usually rides in a cab which is attached to and moves with the bridge) can pick up, move and deposit a load anywhere in the area travelled by the crane. Other, somewhat less common operating options include radio-controlled cranes operable from the ground or other remote location and operator cabs which are trolley, rather than bridge, mounted.

An exemplary overhead crane employs two electric-motor traverse drive systems, one each for the bridge and trolley traverse drives. A third electric-motor drive system is used for hoisting and lowering loads. Such drive systems may be powered by direct current (DC) or alternating current (AC). While DC drive systems were almost universally used in older steel mills and the like, AC variable frequency drive systems are becoming increasingly common, at least in part because of the advantages of precision control and design flexibility which they offer. In a variable frequency drive system, motor speed is a function of the frequency of the electrical voltage applied to it. Examples of AC variable frequency drive systems (used for hoist drives) are described in U.S. Pat. Nos. 4,965,847 (Jurkowski et al.) and 5,077,508 (Wycoff et al.). The leading manufacturer of overhead cranes and AC drive systems therefor is Harnischfeger Industries, Inc. of Milwaukee, Wisconsin. One such AC drive system is sold under the trademark SMARTORQUE ® and the invention involves a modification of a known type of SMARTORQUE ® controller.

Hoist, bridge and trolley drives are operated by an electrical controller coupled to an operator-manipulated master switch in the cab. Such master switch has a handle with a neutral position and a series of positions in each of two directions from neutral. The handle thus controls drive speed in either of two directions. And, subject to the limitation described below, the farther the handle is moved away from the neutral position, the faster the drive moves the load, e.g., the bridge or trolley or the load suspended from the hoist. And the counterpart is that as a master switch is moved toward its neutral position, the drive moves the load more slowly.

In either event, the electric motor and controller "ramp" the speed change so that such change occurs no more rapidly than the maximum predetermined rate set by the slope of the ramp. The quoted expression derives its name from the fact that when depicted on a two-axis graph, the lines representing rates of acceleration and deceleration and are therefore ramp-like in shape. Usually, the control manufacturer sets such rates—they are not changed in day-to-day crane operations.

Before setting forth additional background information, an understanding of some fundamentals will be helpful. One such fundamental relates to alternating current (AC) motors and to some of the operating characteristics of a particular type of such AC motor, i.e., a squirrel cage motor. Another involves some operating principles of a type of motor controller known as an adjustable frequency inverter and the way such a controller is used with an AC squirrel cage motor. Yet another involves what is known as an asymmetrical load, i.e., a load which resists motor rotation in one direction and aids such rotation in the other, and how such a load affects the motor and the control scheme when a squirrel cage motor and adjustable frequency inverter are used to power the hoist drive.

A squirrel cage motor is so named because its rotor (formed with parallel conductors shorted together at their ends) resembles a squirrel cage in shape. In three phase configuration (the type used on crane drives), the motor has only three stator terminals. In other words, there are no rotor terminals "brought out" as with a wound rotor motor.

Such motors exhibit a characteristic "knee-shaped" speed/torque curve and in order to develop any output torque at all, the rotor (or armature, at it is often called) must rotate at a speed somewhat less than the rotational speed of the magnetic field in the stator. The latter speed is often referred to as the synchronous speed. In, for example, a squirrel cage motor having (at 60 Hz line frequency) a synchronous speed of 1,800 RPM, the running speed at rated output torque may be about 1,760 RPM. The difference between the synchronous speed and the running speed is referred to as the "slip" and often slip is expressed as a percent. References herein to "motor speed," "motor rotation" and the like refer to the rotor component of the motor.

The amount of slip is a function of load. Using the foregoing example, a completely unloaded motor may exhibit a running speed of, say, 1,780 RPM since a slight amount of slip is required to develop torque sufficient to turn the rotor. And for each motor, there is some maximum slip (or minimum rotor speed) at which the motor is incapable of exerting further torque. If such motor is loaded above that point, the motor "pulls out," i.e., stalls, and rotation stops.

Another fundamental relating to squirrel cage motors is that the rotational speed is, in general, a function of the frequency of the applied voltage. For example, a motor having a running speed at rated output torque and 60 Hz applied voltage of about 1,760 RPM would have a running speed of about 880 RPM at 30 Hz applied voltage. In recognition of this characteristic of a squirrel cage motor, the above-noted SMARTORQUE ® AC drive system and other systems like it are called "inverters" and are configured to provide an output frequency (and voltage) which can be varied by changing the position of the master switch handle.

An electric motor drive system such as a crane hoist drive represents a somewhat unusual application. Unlike the bridge and trolley drives (and unlike many other types of drives not involving overhead travelling cranes), loads handled by the hoist drive are said to be asymmetrical. That is, the weight of the load either aids or resists motor rotation, depending upon the direction of load movement. More specifically, when the load is being hoisted, the force of gravity resists such upward movement and thus resists motor rotation. On the other hand, when the load is being lowered, the force of gravity (acting, of course, in a downward direction) aids motor rotation and acts in a way to urge the motor to run faster. This is sometimes referred to as an "overhauling load."

A crane hoist drive is not the only type of drive called upon to handle asymmetrical loads. Any drive moving a load between two elevations, e.g., up and down a ramp and by a reversing, sloping conveyor represents such a drive.

U.S. Pat. Nos. 4,965,847 (Jurkowski et al.) and 5,077,508 (Wycoff et al.) depict examples of electric motor drive systems for use on overhead travelling cranes and, more specifically, for use on the hoist systems of such cranes. Such systems power the motor by maintaining a substantially constant ratio between the motor applied voltage and the frequency of such voltage. As a result, the motor has a substantially constant stator current and, consequently, exhibits substantially constant torque over its entire speed range.

Such systems use scalar inverters and often incorporate means for motor speed "checking." If the motor speed is not within a predetermined range of error (of actual speed vs. commanded speed) and if such speed does not come within such range within a predetermined time, the system is shut down. (In contrast, a true closed loop system would be arranged to take corrective action and bring the motor speed within the predetermined range rather than shutting down the system.) The Jurkowski et al. patent is of particular interest since the invention is a substantial improvement upon the technology which it represents.

A disadvantage of systems of the type depicted in the Jurkowski et al. patent is that the time required to "check" whether the actual motor speed is within the predetermined range of permitted error is inordinately long, sometimes approaching one-half second. Yet another disadvantage of such systems is that the bias module producing a voltage representing actual speed uses a single voltage-to-motor speed (or volts per RPM) ratio in both the raising and lowering directions even through the effect of slip is different for each direction. As a result, the predetermined range of permitted error is itself relatively broad and the maximum permitted error (between actual speed and commanded speed) is greater than desired for accurate control. The invention overcomes these disadvantages in a unique way.

OBJECTS OF THE INVENTION

It is an object of the invention to provide an improved method for determining motor speed which overcomes some of the problems and shortcomings of the prior art.

Another object of the invention is to provide an improved method for determining motor speed which is suitable for use in handling asymmetrical loads.

Still another object of the invention to provide an improved method for determining motor speed which is suitable for use on crane hoist drives.

Another object of the invention is to provide an improved method for determining motor speed which reduces the time required to determine whether the actual motor speed is within a predetermined range of permitted error with respect to the commanded motor speed.

Another object of the invention is to provide an improved method for determining motor speed which recognizes the differing effect of slip in drives handling asymmetrical loads.

Yet another object of the invention is to provide an improved method for determining motor speed which reduces the magnitude of the predetermined range of permitted error. How these and other objects are accomplished will become more apparent from the following descriptions and from the drawing.

SUMMARY OF THE INVENTION

The invention is used in conjunction with a drive using a speed-check signal for drive control. As used in this specification and as commonly understood in the industry, the term "drive" means an inverter-type adjustable frequency control panel.

The drive is used with and connected to an AC induction motor (such as a squirrel cage motor) for moving an asymmetrical load, i.e., for moving a load in a hoisting or lowering direction. As used herein, an asymmetrical load means a load which resists load movement in one direction and which aids load movement in the other direction.

In an AC inverter drive connected to an AC induction motor for moving an asymmetrical load in hoisting and lowering directions, a method for determining the speed of the motor includes, in any order, the steps of selecting a first voltage signal representing a maximum speed to be attained by the motor at rated output torque in the hoisting direction, selecting a second voltage signal representing a maximum speed to be attained by the motor at rated output torque in the lowering direction and selecting a bias voltage. The method also includes the steps of combining one of the voltage signals with the bias voltage to obtain a feedback signal representing motor speed and comparing the feedback signal with a speed command signal.

In a highly preferred method, the combining step is preceded by the steps of providing a speed signal representing actual motor speed and determining the direction of motor rotation. The absolute values of the voltage signals are preferably substantially equal and the absolute value of the bias voltage is greater than the absolute value of either of the voltage signals.

In other aspects of the invention, it is preferable to assure that the feedback signal represents a motor speed which is acceptable, i.e., one which is within a particular range of the command signal resulting from positioning the master switch at a selected speed. Therefore, the highly preferred method includes, as a further selecting step, the step of selecting a deviation value representing the maximum permitted deviation of the feedback signal from the speed command signal and the steps of comparing the feedback signal with the speed command signal to obtain a speed deviation signal. The speed deviation signal is them compared with the deviation value to determine whether the deviation is acceptable. If the speed deviation signal exceeds the predetermined deviation value, the drive and motor are disabled. This helps assure that the actual motor speed and the commanded speed do not become unduly disparate.

In one preferred variation, the method also allows a period of time for the out-of-range speed deviation to come within range. Accordingly, the method includes the steps of selecting a deviation correction time and disabling the motor if the speed deviation signal exceeds the deviation value for a time greater than the correction time.

To establish the direction of motor rotation, the determining step includes the steps of generating first and second pulse trains and detecting the phase relationship of the second pulse train with respect to the first pulse train, the latter being a reference pulse train. Preferably, the pulse trains are at substantially the same frequency and such frequency is directly proportional to the speed of the motor.

While the methodology set forth above is the most straightforward in implementation, motor speed may be determined in another, similar way. In this variation, the method includes selecting a first constant representing a voltage per unit of motor speed in the raising direction, selecting ak second constant representing a voltage per unit of motor speed in the lowering direction and selecting a bias voltage. Further steps include determining actual motor speed and direction of rotation and multiplying the motor speed by one of the constants. The product is then combined with the bias voltage to obtain a feedback voltage signal which is then provided to the drive.

In another aspect of this invention, the absolute magnitudes of the constants are different from one another. More specifically, the absolute value of the first constant is greater than the absolute value of the second constant.

Selecting the first constant includes determining the maximum speed to be attained by the motor when operating at rated torque in the hoisting direction. It also includes selecting a first voltage and dividing the first voltage by the above-mentioned maximum speed in the hoisting direction.

Similarly, selecting the second constant includes determining the maximum speed to be attained by the motor when operating at rated torque in the lowering direction. Selecting such second constant also includes selecting a second voltage and dividing the second voltage by the above-mentioned maximum speed in the lowering direction.

(Parenthetically, it is noted that a negative product can be obtained by, for example, designating lowering motor speed as speed in the negative direction or by designating the second constant as being negative in algebraic sign. Other algebraic "conventions, " e.g., designating hoisting speed as negative, work equally well although such a convention may be less intuitively easy to use.) Preferably, the feedback voltage signal is maintained at positive polarity even though the product of motor speed and a constant is negative. Therefore, the absolute magnitude of the bias voltage is greater than the absolute magnitude of either of the products.

BRIEF DESCRIPTION OF THE DRAWING

FIG. 2 is a representative diagram of electrical and mechanical aspects of the hoist drive of the crane of FIG. 1.

DETAILED DESCRIPTION OF PREFERRED EMBODIMENTS

Figure 1:
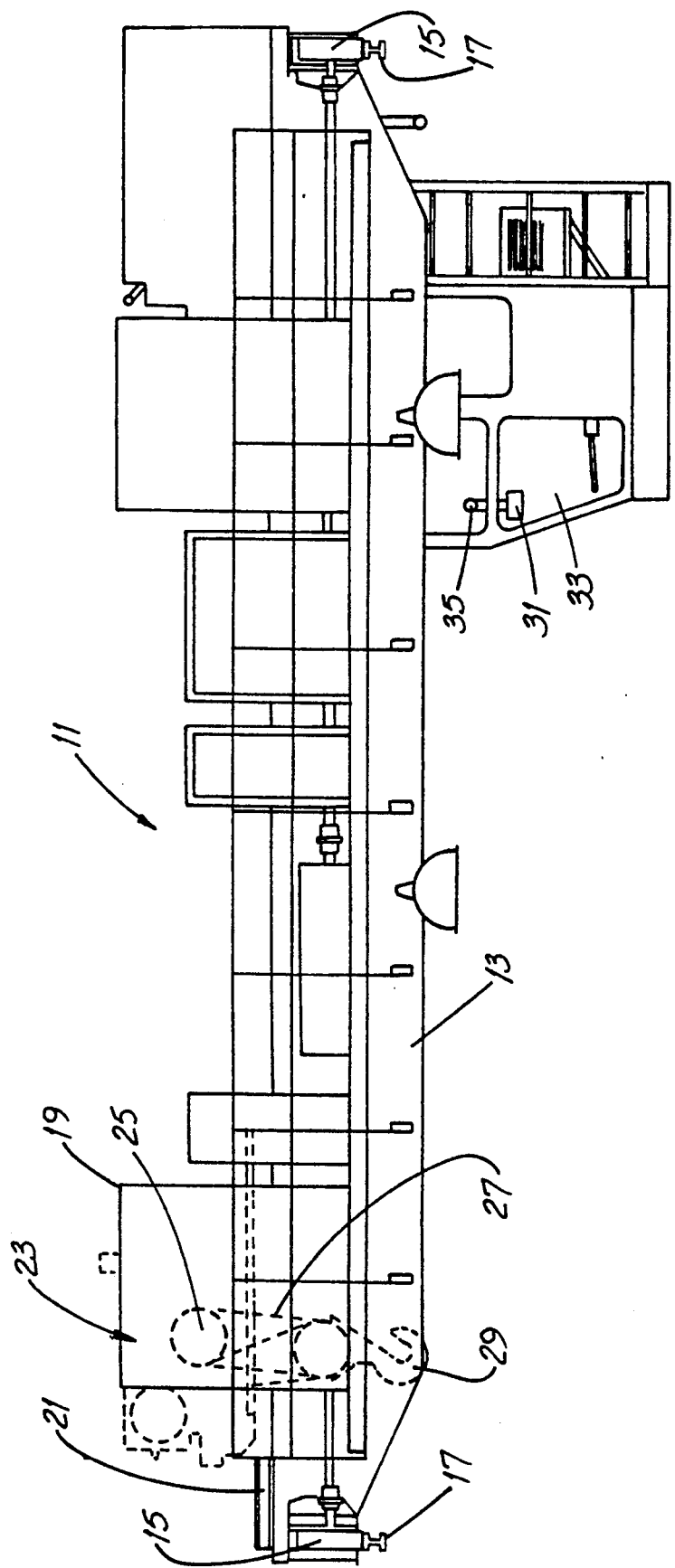
FIG. 1 is a simplified side elevation view of an overhead travelling crane as representing one type of application on which the invention may be used.

Before describing the inventive method, it will be helpful to have an understanding of one type of application with which the method is used. Referring to FIGS. 1 and 2, an overhead travelling crane 11 includes a pair of spaced-apart bridge girders 13 supported at either end by railway-like flanged wheels 15. The wheels 15 ride on rails 17 which, in three dimension, would extend into and out of the drawing sheet. Such rails 17 and, indeed, the entire crane 11 are well above the level of the surface on which rests a load 18 to be moved by the crane 11.

Mounted atop the girders is a trolley 19, itself supported on similar wheels riding rails 21 extending the length of the bridge girders 13. The trolley 19 is equipped with a hoist mechanism 23 comprising a cylinder-like drum 25 having steel cable 27 wrapped around it. Suspended from the cable 27 is a device for lifting a load 18. While a hook 29 is illustrated, such device make take the form of a sling, an electromagnet or other device. As the drum 25 is rotated by the hoist motor, the hook 29 (and any load 18 attached to it) raises or lowers.

Drum rotation (both direction and speed) is controlled by an operator manipulating a master switch 31 in the crane cab 33. When the operator moves the master switch handle 35 in one direction, e.g., "hoist," or the other, e.g., "lower," from a neutral or "off" position, the drum 25 rotates accordingly. And the distance the handle 35 is moved from the neutral position controls the speed of rotation.

FIG. 2 illustrates a representative three-phase AC adjustable frequency inverter drive 37 for controlling the squirrel cage hoist motor 39. Such motor 39 is coupled to the hoist drum 25 through appropriate gearing 41. The drive 37 includes a main line contactor 43, a scalar inverter 45 and a set of dynamic braking resistors 47. Whenever the hoist drive 37 is shut off, an electromagnetic shoe brake 49 holds the motor 39 and drum 25 in a fixed position, even though a load 18 may be suspended from the hook 29.

Figure 3:
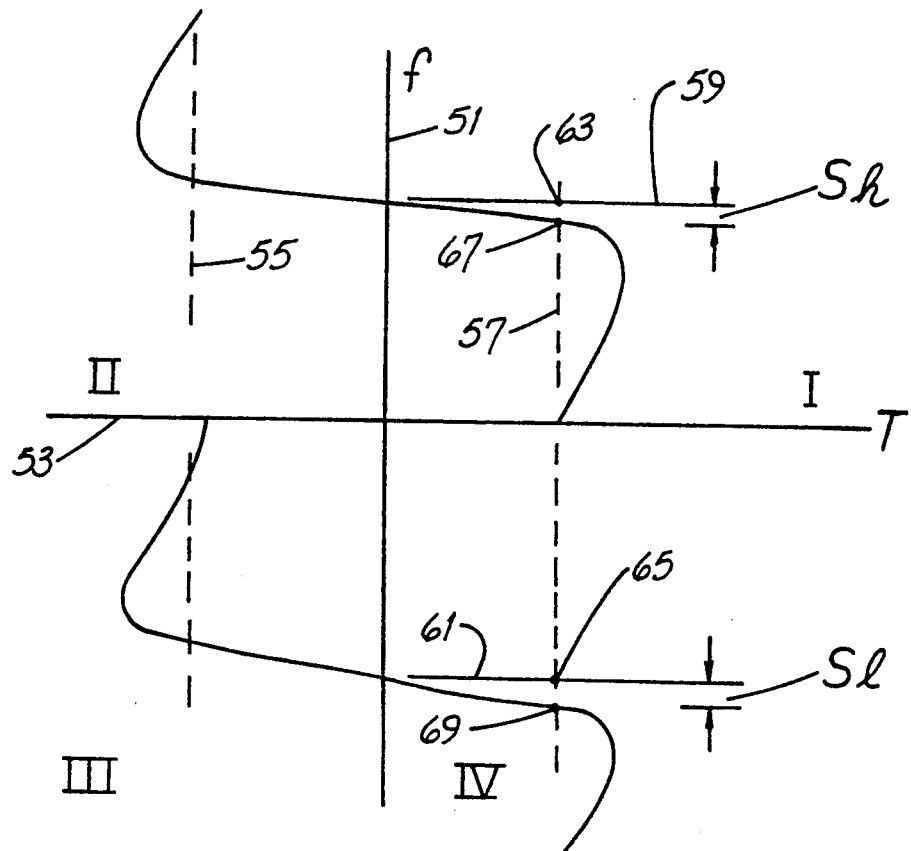
FIG. 3 is a graph depicting representative AC squirrel cage motor speeds and torques in four quadrants.

FIG. 3 is a four-quadrant graph, the vertical axis 51 of which represents rotor frequency and motor speed and the horizontal axis 53 of which represents motor torque. Quadrant I represents a typical load-hoisting operation during which the motor 39 is driving/rotating in the "hoist" direction and the load 18 is moving upward. Quadrant IV represents a typical load-lowering operation during which the motor 39 is rotating in the "lower" direction and the load 18 is moving downward. The dashed vertical lines 55, 57 represent rated torque and the horizontal lines 59, 61 represent the frequency of the voltage applied to the motor 39 (which might be termed the "synchronous frequency"). In the drive 37 of FIG. 2, such frequency changes with changes in the position of the master switch handle 35. The lines 59, 61 also represent theoretical motor speed (synchronous speed) at that frequency as if no slip existed.

However, it will be recalled from the foregoing discussion that to develop output torque, the motor 39 must rotate at a speed different than the rotational speed of the magnetic field in the stator (the synchronous speed) and that the difference between the synchronous speed and the running speed is referred to as "slip." Referred to FIG. 3, the points 63 and 65 represent synchronous speed in the hoisting and lowering directions, respectively, while the points 67 and 69 represent the actual motor speed in the hoisting and lowering directions, respectively, all at rated torque.

The speed difference between point 63 and point 67 represents the motor slip Sh in the hoisting direction while the speed difference between point 65 and point 69 represents the motor slip Sl in the lowering direction. It should be appreciated that in the hoisting direction, slip Sh subtracts from motor synchronous speed. On the other hand, slip Sl adds to the motor synchronous speed in the lowering direction.

Understanding will be further aided by a specific example. It is assumed that the horizontal lines 59, 61 and represent a synchronous speed of 1,200 RPM but, of course, in opposite directions. Point 67, represents 1,150 RPM, the actual motor speed in the hoisting direction at rated torque. The difference, 50 RPM, is slip Sh. Point 69 represents actual motor speed in the lowering direction but, in contrast, such speed is greater than 1,200 RPM, e.g., 1,250 RPM, at rated torque. The difference, 50 RPM, is slip Sl. It is now further apparent that in the hoisting direction, slip Sh subtracts from motor synchronous speed while in the lowering direction, slip Sl adds to the motor synchronous speed.

Figure 5:
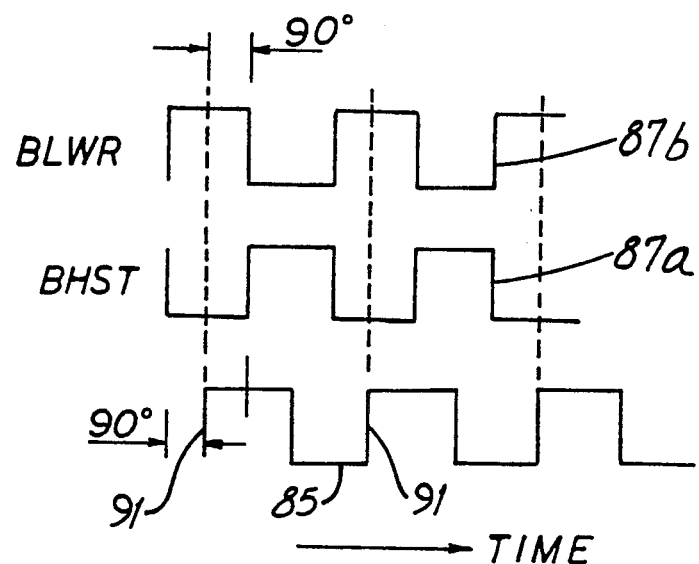
FIG. 5 is a graph of pulse train signals emitted by the encoder of FIG. 4.
Figure 4:
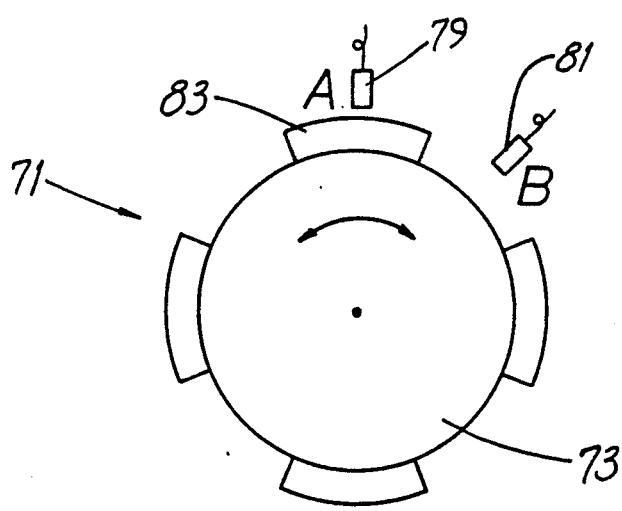
FIG. 4 is a representative depiction of a motor shaft encoder.

The encoder 71, also represented by FIG. 4, is used to determine the speed and direction of rotation of the motor 39. Such encoder 71 includes a rotating wheel-like component 73 coupled to the motor shaft 75 (or to a gearing shaft 77) and rotating at motor speed. Two sensors 79, 81, otherwise denoted as "A" and "B" sensors, are positioned adjacent to the component 73 and as a tooth 83 on the component 73 comes proximate to a sensor 79 or 81, that sensor emits a square-wave signal shown in FIG. 5. In recognition of the fact that electrical "signals" (e.g., voltages) are invisible, the specification uses identifiers, numbers or letters, which refer to the line on which the signal is carried. And it should be appreciated that FIG. 4 is a representation to illustrate operating principles of an actual encoder 71.

The first pulse train signal 85 is from the sensor 79 (denominated as the reference signal "A") in either direction of motor rotation and the second pulse train signal 87a (BHST) is from the sensor 81 when the motor 39 is rotating in the hoisting direction. In such hoisting direction, the signal 87a lags the reference signal 85 by 90 electrical degrees. The signal 87b (BLWR) is from the sensor 81 when the motor 39 is rotating in the lowering direction and such signal 87b leads the reference signal 85 by 90 electrical degrees. It is to be appreciated that at any given time during motor rotation, the signal 87a or the signal 87b is present but not both. It is also to be appreciated that the signal 85 and the signals 87 are at the same frequency and that such frequency changes with changes in motor speed and is proportional to such speed.

From the foregoing, it will be understood that the direction of rotation of the component 73 (and, therefore, of the motor 39) governs whether the sensor 79 or the sensor 81 is the first to emit a signal.

Figure 6:
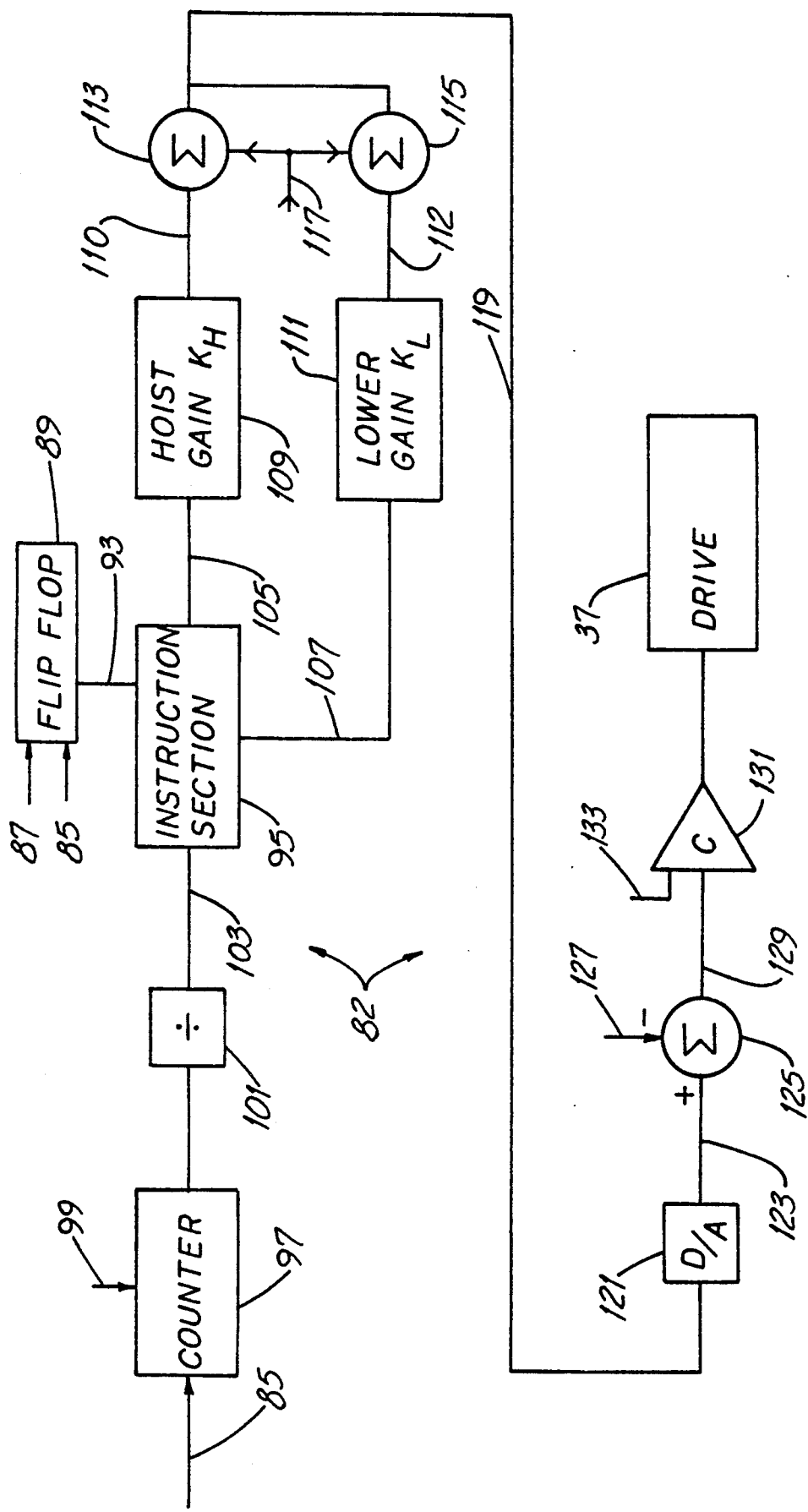
FIG. 6 is a diagram of a microprocessor-based system useful in the inventive method.

Referring additionally to the system 82 represented by the diagram of FIG. 6, the signal 85 and one of the signals 87a or 87b are directed to a flip-flop circuit 89 comprised of two NOR gates used to detect the phase relationship of the second pulse train 87 with respect to the first pulse train 85. In other words, the flip-flop circuit determines whether the signal 87 lags or leads the signal 85.

The flip-flop circuit 89 functions as a sample-and-hold circuit which is "sampling" the value of one signal (signal 85 or 87) while being triggered by the other. Sampling of a signal 87 is performed at an instant coincident with the leading (that is, rising) edge 91 of the signal 85. In this way, the circuit 89 consistently samples the signal 87a "high," i.e. at its maximum value, and the signal 87b "low," i.e., at its minimum value. Therefore, the circuit 89 provides a signal 93 that "tells" an instruction section 95 whether the motor 39 is running in the hoising or lowering direction.

Other portions of the system 82 will now be discussed. It should be appreciated that the diagram showing system 82 represents activity controlled by computer programming as well as activity controlled by electrical circuits. The system 82 also includes a counter 97 which receives the signal from the sensor 79 and receives a clock signal from the circuit microcontroller. The counter 97 measures the time required for the signal 85 to make one complete cycle, i.e., such counter 97 measures the "period" of such signal 85.

Such period (measured in small fractions of a second) is fed into a "divide by" circuit 101 which, in effect, divides such period into the numeral "1" to obtain the motor speed which closely approximates rotor frequency. For example, if the period was measured to be one-three hundredth of a second (0.0033 seconds in decimal form), the motor speed is about 300 RPM. Such speed/rotor frequency signal 103, proportional to rotor frequency, is directed in the form of a computerized 16-bit "word" to the instruction section 95 along with the direction signal 93.

Such section 95 provides a computerized 8-bit word, referred to as a voltage signal +V or −V (105 or 107, respectively), the absolute value of which represents motor speed and the algebraic sign of which represents direction of motor rotation. The voltage signal 105 may also be termed a "hoisting" signal and the voltage signal 107 a "lowering" signal. A gain section 109 or 111 applies gain to such signal 105, 107 which is then fed into one or the other of voltage summing circuits 113 or 115, each of which also receives a positive bias voltage 117. Like other signals, the bias voltage 117 is represented by a digitized word. Such circuit 113 or 115 algebraically combines or sums the bias voltage 117 and the first or second voltage signal 110 or 112, respectively, and provides a digital feedback signal 119.

Such feedback signal 119 is directed to a digital-to-analog converter 121 which converts it to an analog voltage 123. Such analog voltage 123, which is always positive as discussed below, is directed to a summing circuit 125 to which is also directed a negative voltage speed command signal 127 representing the motor speed commanded by the master switch setting. These two voltages 123, 127 are algebraically summed and the resulting speed deviation signal 129 directed to a comparator 131. Also directed to the comparator 131 is a fixed, predetermined deviation value signal 133. Such signal 133 represents a value which is the maximum permitted deviation between the actual motor speed and the commanded motor speed. If the comparator 131 detects that the speed deviation signal 129 exceeds the deviation value signal 133, the drive 37 is disabled.

Some specific examples will now be provided. In the specific cases of the maximum motor speeds in hoisting and lowering, 1,150 RPM and 1,250 RPM, respectively, it is assumed that a value of 3.75 volts is selected for each of the first and second voltage signals 110, 112. Such values may have algebraic signs denoting direction of rotation, i.e., hoisting or lowering, or the speed signal 103 itself may be "signed." It is also assumed that a bias voltage 117 of 5 volts is selected.

One of the voltage signals 110 or 112 is combined with the bias voltage 117 to obtain a feedback signal 119 representing actual motor speed. In this example, the feedback signal 119 representing actual motor speed in the hoisting direction is 5 plus 3.75 or 8.75 volts. The feedback signal 119 representing actual motor speed in the lowering direction is 5 minus 3.75 or 1.25 volts, each feedback signal 119 being of positive polarity. It should be here noted that a feedback voltage 119 above 5 volts represents hoisting while a feedback voltage 119 less than 5 volts represents lowering.

It is also assumed that the hoisting direction is involved and that the speed command signal 127 is minus 8.8 volts. Therefore, the algebraic sum of the hoist feedback signal 119 and the speed command signal 127 is minus 0.05 volts (8.75 volts minus 8.80 volts) and constitutes the speed deviation signal 129. If the deviation value signal 133 is selected to be 0.10 volts, it is apparent that the speed deviation signal 129 is "within range" and operation of the drive 37 continues.

Now it is assumed that the feedback signal 119 representing actual motor speed in the hoisting direction is 5 plus 4.0 or 9.0 volts and that the speed command signal 127 is minus 8.8 volts. If the assumed deviation value signal 133 remains at 0.10 volts, it is apparent that the speed deviation signal 129 is "out of range." The comparator 131 detects this fact and functions to disable the drive 37, preferably after a brief correction time during which the speed deviation signal 129 has an opportunity to reach a value less than the deviation value 133.

The method will now be considered in accordance with the variation discussed above. For this example, it is assumed that the maximum motor speeds in hoisting and lowering directions (at rated torque), 1,150 RPM and 1,250 RPM, respectively, are represented by the value of 3.75 volts. The first constant is selected by dividing 3.75 by 1,150 RPM and the resulting voltage per unit of motor speed is 0.00326 in the hoisting direction. Similarly, the second constant is selected by dividing 3.75 by 1,250 RPM and the resulting voltage per unit of motor speed is 0.003 in the lowering direction. It will be noted that for this approach, the absolute values of the constants are different from one another and that of the first constant is greater than that of the second constant.

The actual motor speed and direction of rotation are then determined and it is assumed that the motor is running at 630 RPM in the hoisting direction. Such motor speed is then multiplied by 0.00326 and the product, 2.054, is combined with the 5 volt bias voltage 117 to obtain a feedback voltage signal 119, 7.054 volts in this example. The feedback signal 119 is then combined or summed with the command signal 127 in the manner described above and the resulting "error" directed to the comparator 131 for measurement against the maximum permitted error.

A reason for the specific voltage values given in the examples is that, in one specific embodiment of components used to carry out the method, the maximum acceptable value of the feedback voltage signal 119 into the digital-to-analog converter 121 is 10 volts and such voltage must be positive in polarity. Further, a readily-available bias voltage 117 is +5 volts.

And because of the ability of the exemplary drive 37 to accept only positive feedback voltage signals 119 and because of the value and polarity of the readily-available bias voltage 117, i.e., +5 volts, it is also convenient that the first and second voltage signals 110, 112 (or the product of the motor speed and one of the constants, as the case may be) be less than 5 volts. In that way, the resultant feedback voltage signal 119 never exceeds 10 volts and never goes below 0 volts.

By recognizing the additive or subtractive effect of slip $S_l$ or $S_h$, respectively, on synchronous speed to provide actual speed, the new method eliminates an error present in earlier systems which did not recognize such error-producing difference. As a consequence, earlier systems were required to permit a much larger deviation between actual and commanded speed, sometimes in the range of 10-20% or so. In addition, earlier systems required substantial time to determine the deviation. In the microcontroller-based equipment used to carry out the new method, this time has been reduced to on the order of 0.1 second or so. Therefore, an "out-of-range" speed can be detected much more quickly.

While the principles of the invention have been described in connection with only a few variants of the method, it should be understood clearly that such variants are exemplary and not limiting.

I claim:

1. In a drive using an AC induction motor for moving a load in hoisting and lowering directions, a method for determining motor speed including, in any order, the selecting steps of:

selecting a first voltage signal representing a maximum speed to be attained by the motor at rated output torque in the hoisting direction;

selecting a second voltage signal representing a maximum speed to be attained by the motor at rated output torque in the lowering direction;

selecting a bias voltage;

and further including the steps of:

combining one of the voltage signals with the bias voltage to obtain a feedback signal representing motor speed; and, comparing the feedback signal with a speed command signal.

2. The method of claim 1 wherein the selecting steps further includes the step of:

selecting a deviation value representing the maximum permitted deviation of the feedback signal from the speed command signal.

3. The method of claim 2 further including the steps of:

comparing the feedback signal with the speed command signal to obtain a speed deviation signal; and, comparing the speed deviation signal with the deviation value.

4. The method of claim 3 including the further step of disabling the drive if the speed deviation signal exceeds the predetermined deviation value.

5. The method of claim 1 including, as additional selecting steps, the steps of:
   selecting a deviation value representing the maximum permitted deviation between the feedback signal and the speed command signal;
   selecting a deviation correction time;
and the method includes the further steps of:
   comparing the feedback signal with the speed command signal to obtain a speed deviation signal; and,
   disabling the motor if the speed deviation signal exceeds the deviation value for a time greater than the correction time.

6. The method of claim 5 wherein the absolute values of the voltage signals are substantially equal.

7. The method of claim 6 wherein the absolute value of the bias voltage is greater than the absolute value of either of the voltage signals.

8. The method of claim 1 wherein the combining step is preceded by the steps of:
   providing a speed signal representing actual motor speed; and,
   determining the direction of motor rotation.

9. The method of claim 8 wherein the determining step includes the steps of:
   generating first and second pulse trains; and,
   detecting the phase relationship of the second pulse train with respect to the first pulse train.

10. The method of claim 9 wherein the pulse trains are at substantially the same frequency.

11. The method of claim 10 wherein the frequency of the pulse trains is directly proportional to the speed of the motor.

12. In an AC inverter drive connected to an AC induction motor for moving a load in hoisting and lowering directions, a method for determining motor speed including, in any order, the steps of:
   selecting a first constant representing a voltage per unit of motor speed in the hoisting direction;
   selecting a second constant representing a voltage per unit of motor speed in the lowering direction;
   selecting a bias voltage;
and further including the steps of:
   determining actual motor speed and direction of rotation;
   multiplying the motor speed by one of the constants;
   combining the product with the bias voltage to obtain a feedback voltage signal; and,
   providing the feedback voltage signal to the drive.

13. The method of claim 12 wherein the absolute magnitudes of the constants are different from one another.

14. The method of claim 13 wherein the absolute value of the first constant is greater than the absolute value of the second constant.

* * * * *